Dec. 10, 1946.  E. W. YATES ET AL  2,412,549
AUTOMATIC PATTERN CONTROLLED MILLING MACHINE
Filed June 10, 1943  7 Sheets-Sheet 1
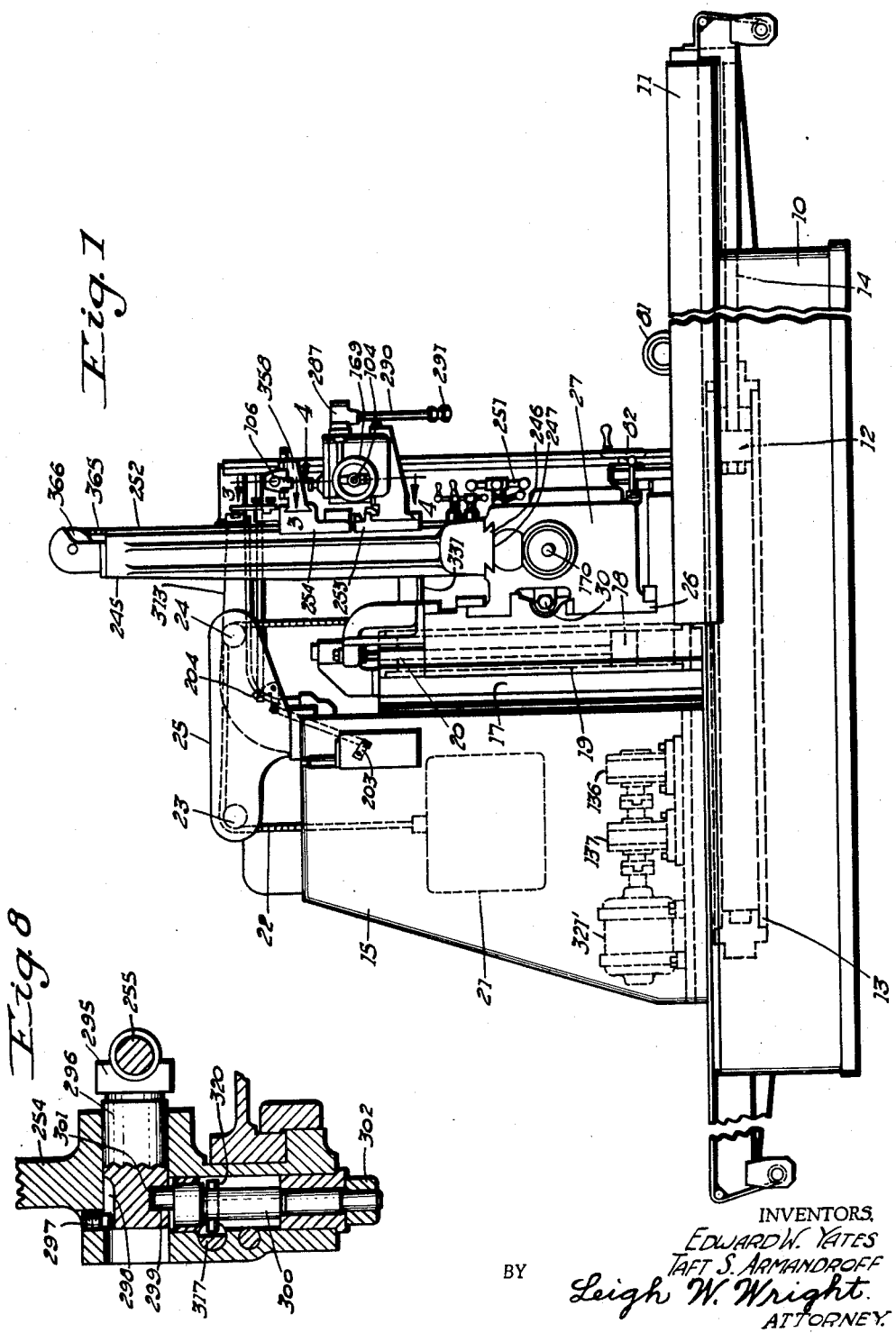
INVENTORS.
EDWARD W. YATES
TAFT S. ARMANDROFF
BY Leigh W. Wright
ATTORNEY.

Dec. 10, 1946.    E. W. YATES ET AL    2,412,549
AUTOMATIC PATTERN CONTROLLED MILLING MACHINE
Filed June 10, 1943    7 Sheets-Sheet 2
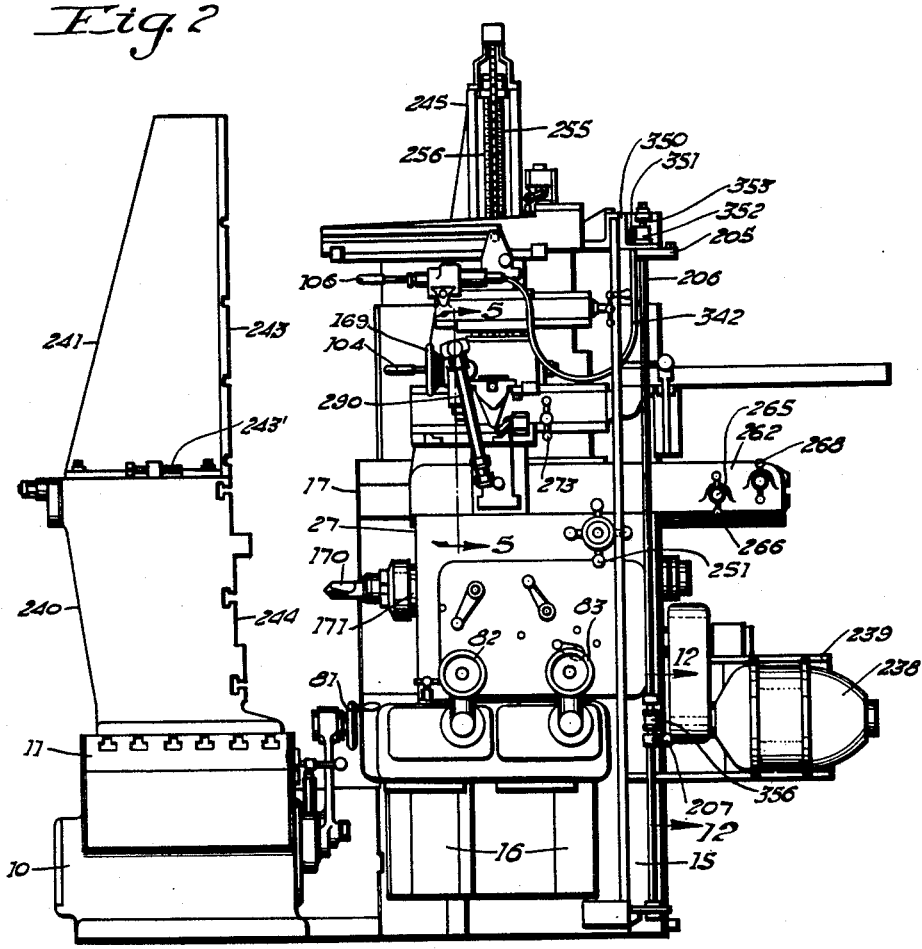
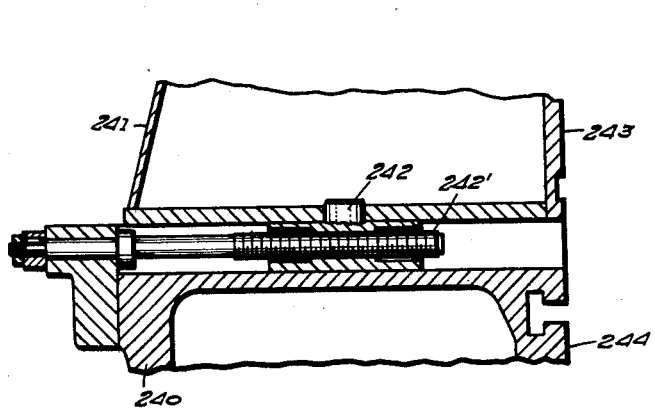
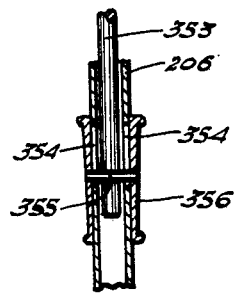
INVENTORS,
EDWARD W. YATES
TAFT S. ARMANDROFF
BY Leigh W. Wright.
ATTORNEY.

Dec. 10, 1946.  E. W. YATES ET AL  2,412,549
AUTOMATIC PATTERN CONTROLLED MILLING MACHINE
Filed June 10, 1943  7 Sheets-Sheet 3

INVENTORS.
EDWARD W. YATES
TAFT S. ARMANDROFF
BY Leigh W. Wright.
ATTORNEY.

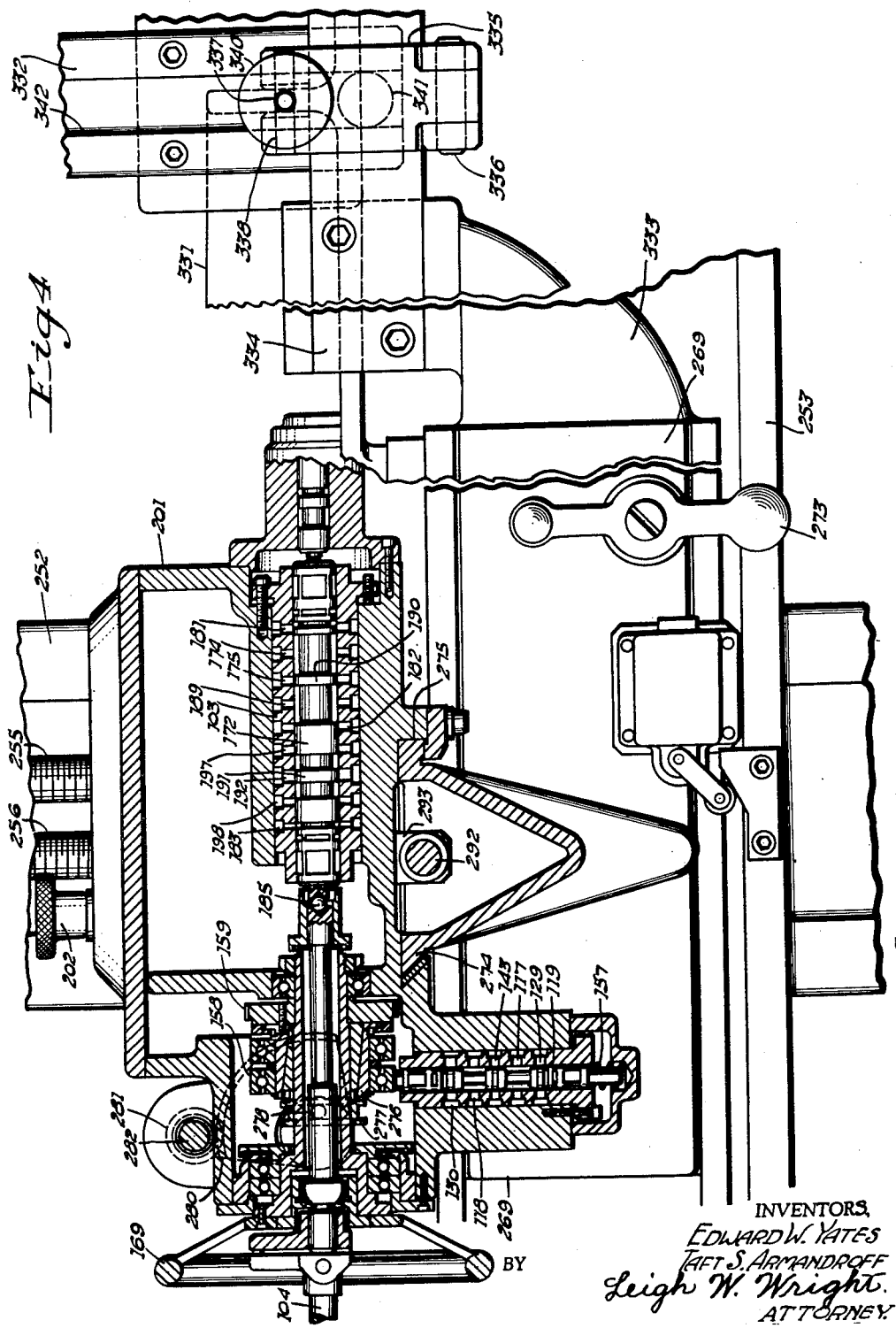

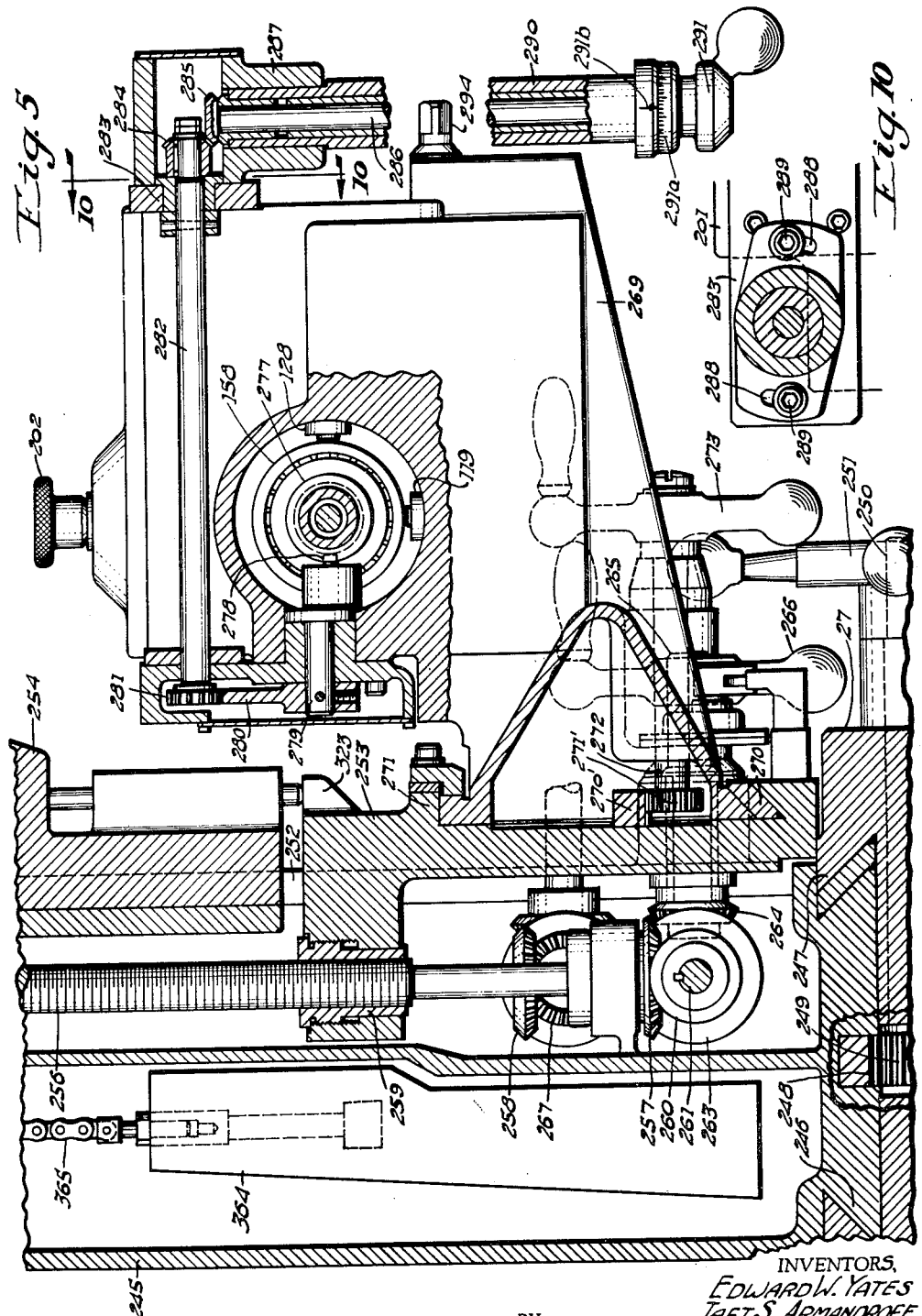

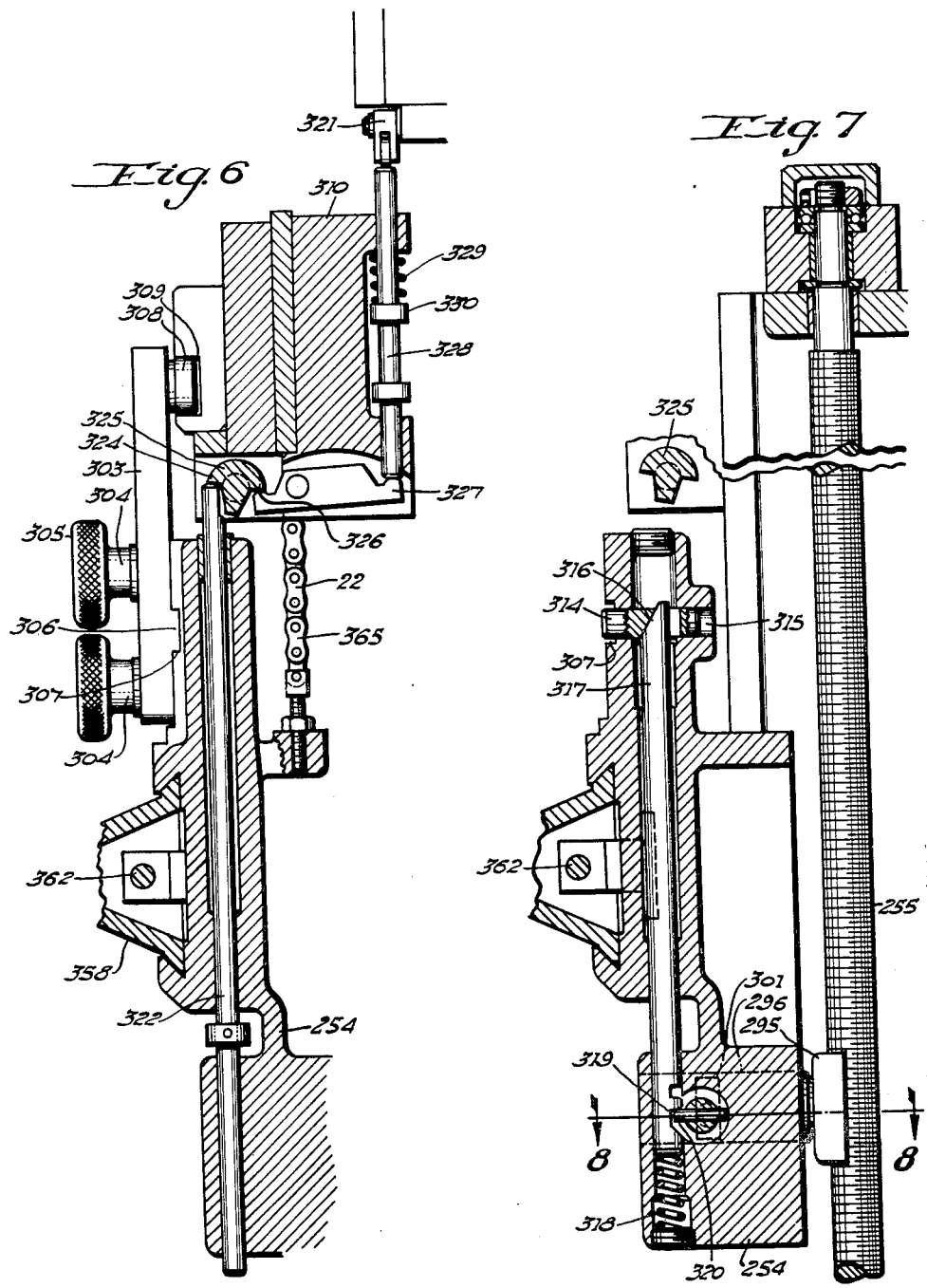

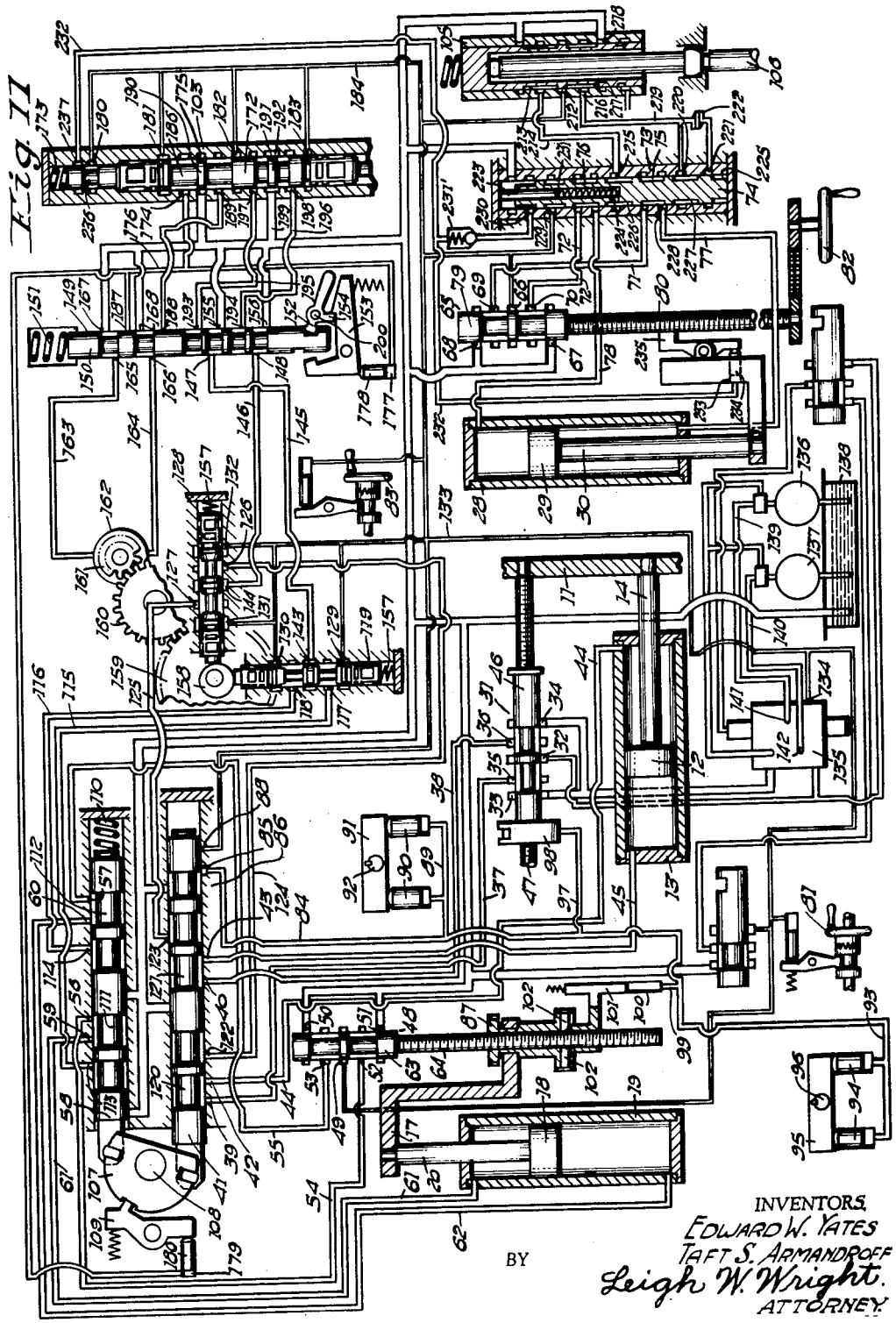

Patented Dec. 10, 1946

2,412,549

UNITED STATES PATENT OFFICE 2,412,549

AUTOMATIC PATTERN CONTROLLED MILLING MACHINE

Edward W. Yates and Taft S. Armandroff, Cincinnati, Ohio, assignors to The Cincinnati Milling Machine Co., Cincinnati, Ohio, a corporation of Ohio Application June 10, 1943, Serial No. 490,366

15 Claims. (Cl. 90—13.5)

This invention relates to milling machines and more particularly to automatic pattern controlled milling machines.

In the formation of irregular surfaces on a work piece by automatic means, it is common practice to utilize a pattern for engagement by a tracer, which is usually connected to the tool support to govern or control the irregular path of movement of the tool.

Some operations of this kind are rather simple in that they are merely an outlining operation, requiring two-directional movement, while others are more complicated, ultimately requiring three-directional movement of the cutting tool in order to complete the operation. In many cases it is necessary to combine the different methods of operation, such as forming one portion of a surface by pattern controlling two-directional movement of the tool in one plane, and then changing over and pattern controlling two-directional movement of the tool in a second plane usually at right angles to the first plane. When the work has a constant cross-sectional shape in a given direction it becomes possible to utilize a relatively thin two-dimensional plate as a pattern rather than a large three-dimensional block.

In view of all of these various requirements and methods of operation it is an object of this invention to provide a pattern controlled milling machine having a cutting tool which is capable of three-directional relative movement with respect to a work piece, that is, axially and two directions laterally, with improved control means whereby in a single machine it is easily and readily possible to selectively pattern control the axial movement only; pattern control the two lateral movements simultaneously and in variable proportion whereby a 360° orbit may be obtained; or to control simultaneously all three directions of movement of the tool and in an automatic manner.

Another object of this invention is to provide an automatic three-directional pattern controlled milling machine.

A further object of this invention is to provide a pattern controlled milling machine with two automatic pattern controlled tracers and suitable selective connections whereby either may be used individually to automatically control movement of the tool in respective planes, or intercoupled for simultaneously controlling the movement of the tool in three directions simultaneously.

An additional object of this invention is to provide a dual tracer, pattern controlled milling machine with means for individually adjusting the tracers relative to one another and with respect to the cutting tool for set-up purposes and to provide means for preventing movements dictated by one tracer from being imparted to the other tracer whereby simplified patterns may be used to produce a three-dimensional surface on the work.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is an end elevation of the machine shown in Figure 1 as viewed from the right hand side of that figure.

Figure 4 is an enlarged view of the other tracer support including a section through the tracer control valve.

Figure 5 is a section on the line 5—5 of Figure 2.

Figure 6 is a section on the line 6—6 of Figure 3.

Figure 7 is a section on the line 7—7 of Figure 3.

Figure 8 is a detailed section on the line 8—8 of Figure 7.

Figure 9 is a detailed view of the pattern support adjusting mechanism.

Figure 10 is a detail section on the line 10—10 of Figure 5.

Figure 11 is a diagrammatic view of the hydraulic control circuit.

Figure 12 is a section on the line 12—12 of Figure 2.

Figure 3:
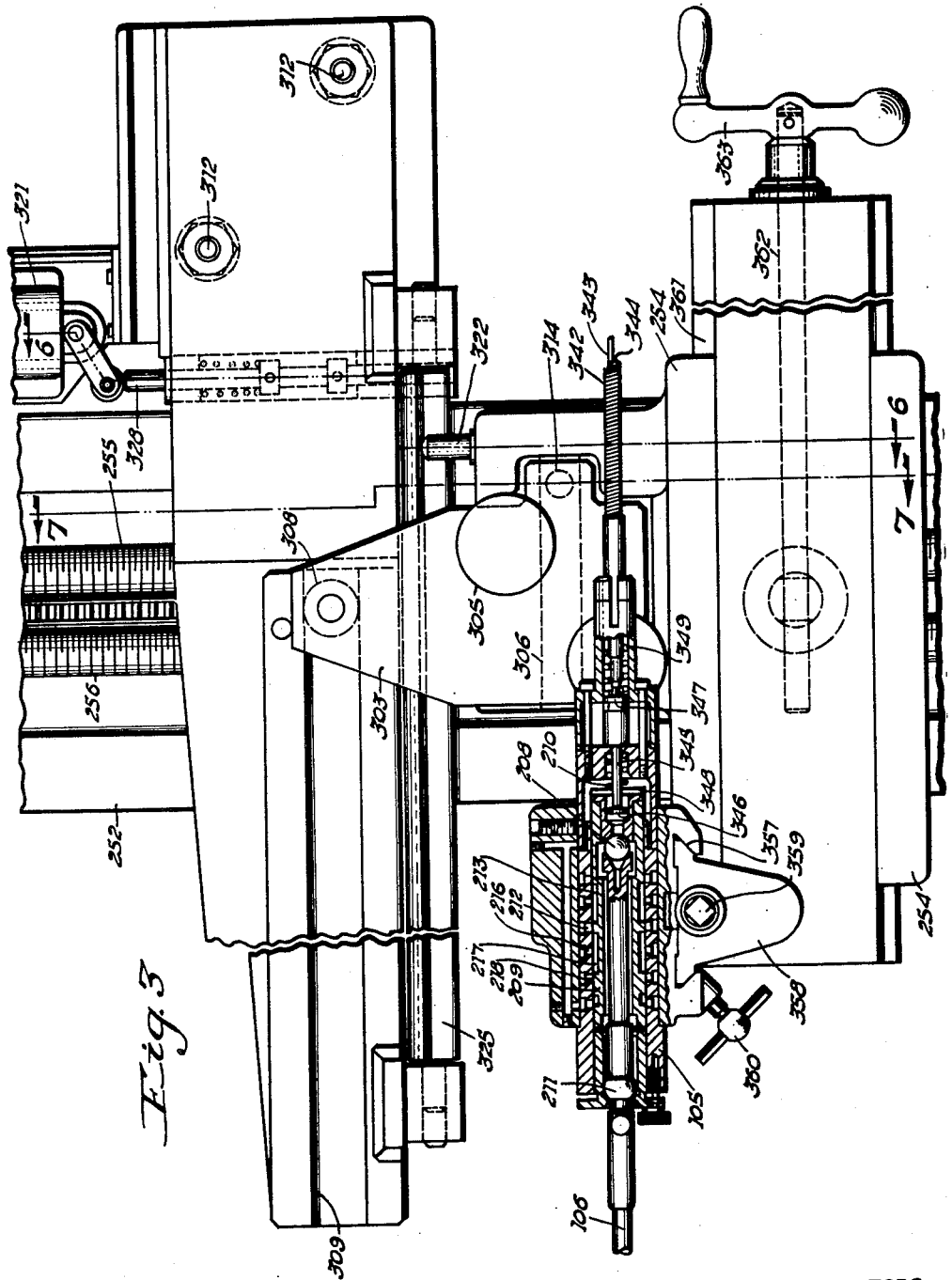
Figure 3 is an enlarged view of the depth control tracer bracket including a cross sectional view through the tracer mechanism.

Referring to the drawings and more particularly to Figures 1 and 2 the reference numeral 10 indicates the bed of the machine upon which a table 11 is slidably mounted and adapted to be propelled by a piston 12 slidably mounted in a cylinder 13, and connected by a piston rod 14 to the table. A column 15 uprises at the rear of the bed to which it is integrally connected. The column has vertical guideways 16 formed thereon upon which slides a vertically movable carrier 17. This carrier is adapted to be propelled by a piston 18 contained in a cylinder 19, the cylinder being integral with the column, and a piston rod 20 serves to connect the piston to the slide. On account of the weight of the slide 17, and the other parts attached thereto which are to be described, the slide 17 is counterbalanced by a counterweight 21 which is connected to the slide by a chain 22 passing over pulleys 23 and 24 mounted in a bracket 25 attached to the top of the column.

The slide 17 has horizontal guideways 26 formed therein for slidably supporting a spindle carrier 27 for movement toward and from the table. The spindle carrier is also adapted to be propelled by a hydraulic motor comprising a cylinder 28 containing a piston 29 which is operatively connected by a piston rod 30 to the carrier 27. The cylinder 28 is fixed in the slide 17.

Power feeding and manual adjustment of the three slides is controlled by individual servovalves. As shown in Figure 11, the piston and cylinder motor 12, 13 for the table is adapted to be controlled by a servo-valve indicated generally by the reference numeral 31 which has a pressure port 32, a pair of exhaust ports 33 and 34, and a pair of motor ports 35 and 36. The channels 37 and 38 from ports 35 and 36 terminate in ports 39 and 40 of a selector valve having a plunger 41.

When the plunger is in the position shown in Figure 11 the ports 39 and 40 are connected to ports 42 and 43 respectively which have channels 44 and 45 that terminate in opposite ends of the cylinder 13. When the servo-valve plunger 46 is in a central position as shown, the piston 12 and thereby the table is held stationary. The valve 31 is adapted to be moved by a servo-screw 47.

The piston and cylinder 18, 19 for the vertical slide 17 have a servo-valve indicated generally by the reference numeral 48 which has a pressure port 49, a pair of exhaust ports 50 and 51 and a pair of motor ports 52 and 53. These latter ports are connected by channels 54 and 55 to ports 56 and 57 of a selector valve having a control plunger 58. When this plunger is in the position shown, the ports 56 and 57 are connected to ports 59 and 60 from which channels 61 and 62 extend to opposite ends of the cylinder 19. When the servo-valve plunger 63 is in the position shown all flow to and from the cylinder 19 is cut off and the piston 18 is held stationary. The valve plunger 63 may be operated by a servo-screw 64.

The piston and cylinder motor 29, 28 for the spindle carrier slide 27 has a servo-valve indicated generally by the reference numeral 65 in which is a pressure port 66, a pair of exhaust ports 67 and 68 and a pair of motor ports 69 and 70. These latter ports are connected by channels 71 and 72 to a selector valve indicated generally by the reference numeral 73 and having a plunger 74 in which is formed grooves 75 and 76 for interconnecting channels 71 and 72 to channels 77 and 78 which terminate in opposite ends of the cylinder 28. When the servo-valve plunger 79 is in the central position shown, the piston 29 is held stationary. The valve plunger 79 may be actuated by a servo-screw 80.

The various servo-valve control screws 47, 64 and 80 may be power actuated or manually actuated by a mechanism such as that shown in U. S. Patent No. 2,239,625, issued April 22, 1941, and since the particular form of driving mechanism forms no part of the present invention further description thereof is not believed to be necessary. The various hand wheels for rotating the servo-screws are shown, however, in Figures 2 and 11 and in these figures the hand wheel 81 is operatively connected to the servo-screw 47, the hand wheel 82 is operatively connected to the servo-screw 80 and the hand wheel 83 is operatively connected to the servo-screw 64.

No power means have been provided in this machine for power driving the servo-screw 80 but the other two screws may be power driven, and suitable interlocks are provided whereby when tracer control is utilized the power actuating means will be immobilized. At the same time the servo-screws must be operatively disconnected from the actuated slide. This is all accomplished automatically by admitting pressure to one channel which is the channel 84 shown in Figure 11 having one terminus connected to port 85 of the selector valve 86 which contains the plunger 41. This valve has a pressure port 88 which is connected by the plunger 41, when it is shifted to the right of the position shown, to port 85 whereby pressure is admitted to channel 84.

This channel has a first branch line 89 terminating in a pair of cylinders 90 which contain plungers for rotating a neutralizing lever 91 which is centrally connected to a rotatable shaft 92. Rotation of this shaft will neutralize or stop the power transmission not shown for the vertical servo-screw 64, but which is connected to the gear 87. A second branch connection 93 serves to connect channel 84 to a pair of cylinders 94 containing plungers for rotating a lever 95 centrally connected to a shaft 96 for disconnecting the power transmission to the servo-screw 47.

A third branch connection connects this channel to a disengageable nut 98 for disconnecting the servo-valve plunger 46 from the table servo-screw 47. Another branch channel 99 terminates in a cylinder 100 having a plunger 101 for camming the nut portions 102 out of engagement with the screw 64 whereby the vertical slide 17 may move independent of the screw.

For automatic tracer controlled operations the vertical slide and the table are operatively connected for control by a tracer control valve indicated generally by the reference numeral 103 which supports a tracer finger 104 and shown in Figures 2 and 4. The cross slide or spindle carrier 27 is operatively connected to a tracer control valve 105 which, in turn, is controlled by a tracer finger 106 as shown in Figure 3. It will be noted that the selector valve plungers 58 and 41 in Figure 11 are operatively connected to a rotatable crank 107 fixed on a rotatable shaft 108 for joint operation.

The two plungers 58 and 41 together constitute a selector valve which selects between manual operation and automatic tracer controlled operation of the table 11 and the vertical slide 17. The plungers are shown in a manual control position and are held in this position by a spring pressed latch 109. When this latch is removed a spring 110 operating on the end of plunger 58 shifts it to the left, as viewed in Figure 11, and through crank 107 shifts the plunger 41 to the right. This results in the following connections being established.

The ports 59 and 60 which control the piston 18 are connected by the annular grooves 111 and 112 to ports 113 and 114 which have channels 115 and 116 leading to ports 117 and 18 of a reversing valve 119. Likewise, the ports 42 and 43 which control the table piston 12 are connected by annular grooves 120 and 121 in plunger 41 to ports 122 and 123 having channels 124 and 125 which terminate in ports 126 and 127 of a reversing valve 128.

The valve 119 has a pair of pressure ports 129 and 130 and the valve 128 has a pair of pressure ports 131 and 132 and all of these pressure ports are connected to a common supply channel 133 which is connected to port 134 of a feed-rapid traverse selector valve 135. This valve is supplied by a rapid traverse pump 136 and a feed pump 137 which have suitable intakes for withdrawing fluid from a reservoir 138 and individual channels 139 and 140 which terminate at ports 141 and 142 in the selector valve. The port 142 is continuously connected to the port 134 whereby the channel 133 is always maintained under pressure by the feed pump.

Each of the reversing valves 119 and 128 have an exhaust port 143 and 144 respectively which are connected by channels 145 and 146 to ports 147 and 148 of a control valve 149. This valve has a plunger 150 which is normally urged in one direction by a spring 151 to an automatic tracer control position. It may be moved by a rotatable crank 152 against the resistance of spring 151 to a manual control position and latched in that position by a spring-pressed latching lever 153 which is engageable with a lug 154 projecting from the crank 152. When the plunger 150 is in the position shown the ports 147 and 148 are connected by grooves in the plunger to exhaust ports 155 and 156 respectively.

The reversing valve plungers 119 and 128 are held by springs 157 into engagement with an eccentric 158 which is operatively connected to a gear 159. The rotary position of the eccentric determines the relative positions of the reversing valves and thereby the direction of resultant movement of the cutter. The gear 159 is connected through an intermediate idler 160 to a pinion 161 integral with a rotatable hydraulic motor 162. The hydraulic motor is connected by channels 163 and 164 to ports 165 and 166 respectively of valve 149. When this valve is in the position shown, these ports are connected by annular grooves in the valve to reservoir ports 167 and 168.

It should now be evident that the two reversing valves 119 and 128 are hydraulically connected directly to the opposite ends of the table cylinder, and to the opposite ends of the vertical cylinder 19 respectively for controlling reversible operation of the connected slides. The particular manner in which these valves control or proportion the flow to these two cylinders to proportion the rates of simultaneous movement thereof is more particularly described and claimed in the co-pending U. S. application Serial No. 409,171, filed September 2, 1941, now Patent No. 2,332,533, issued October 26, 1943. It is sufficient to say that the eccentric 158 may be rotated manually by the hand wheel 169 shown in Figure 4 to control the direction of resultant movement of the table and vertical slide, or in other words, control the path of movement of the cutting tool 170 shown in Figure 2 which is attached to a rotatable spindle 171 mounted in the spindle carrier 27. This manual rotation may be accomplished with the valve 150 in the position shown because at that time the hydraulic motor 160 is connected to reservoir and thus offers no resistance to the movement.

The tracer valve 103 controls automatic rotation of eccentric 158 and has a valve plunger 172 which is normally urged in one direction by a spring 173 and when the tracer is out of engagement with the pattern the plunger 172 may be urged to its lowest position as viewed in Figure 11 which results in a port 174 being connected to a reservoir port 175. The port 174 has a channel 176 which branches to a first cylinder 177 containing a piston 178 operable to disengage the latch 153, and to a second cylinder 179 containing a piston 180 for disengaging the latch 109. The tracer valve has four pressure ports 180, 181, 182 and 183 which are all supplied through a branch 184 of the supply line 133.

When the tracer finger 104 engages a pattern or other object it causes through the ball and socket connection 185, shown in Figure 4, an axial movement of the plunger 172 to the right as viewed in Figure 4 or upward as viewed in Figure 11 whereby annular groove 186 interconnects pressure port 181 with port 174. This results in an immediate flow of fluid pressure to cylinders 177 and 179 whereby the latch levers 153 and 109 are withdrawn, causing plunger 150 to shift down, and the plungers 58 and 41 to shift to the left and to the right respectively by spring 110. This places the eccentric 158 under automatic control of the tracer 104.

The motor ports 165 and 166 now become connected to ports 187 and 188 and thereby through channels to tracer valve ports 174 and 189 respectively. Since the channel 176 is already under pressure as previously explained and has a branch connection to port 187, fluid pressure will flow through channel 163 to cause rotation of the hydraulic motor 162. This is permissible because the port 189 is connected to the exhaust port 175. The hydraulic motor will continue to rotate until the tracer finger is held in a balanced position by the pattern with the tracer valve 172 in a central position. This means that the pattern is acting to restrain excessive deflection of the tracer and that the spring 173 is continuously urging the tracer into engagement with the pattern.

A balanced condition will be reached in which the spool 190 of the tracer valve is centralized with respect to the port 175 and a second spool 191 is centralized with respect to a reservoir port 192. When the spool 190 is centralized with respect to the port 175 flow either to or from the motor 162 will be stopped whereby the motor will stop, and the parts are now conditioned whereby any shift in movement of the spool 190 will cause connection of the pressure port 181 to either the port 174 or port 182 to port 189.

This portion of the tracer valve now acts as a reversing valve to control reversible rotation of motor 162 and a resultant variation in the direction of movement of the table and vertical slide, the other spool 191, being centralized with respect to the port 192, will act as a resistance to control the return flow from the slide reversing valves through channels 145 and 146 respectively.

Due to the downward shifting of the plunger 150, the ports 147 and 148 will become connected to ports 193 and 194 and thereby through channels 195 and 196 to ports 197 and 198 in the tracer valve. Attention is invited to the fact that when the tracer valve is centralized or in a neutral position the ports 197 and 198 are partially open and the spool 191 is smaller in width than the port 192 whereby a pressure opening exists on either side of the spool to permit return flow from both of channels 195 and 196 to the reservoir channel 199. It will now be evident that any shift of the tracer valve and thereby of the spool 191 in either direction will restrict the flow from both of channels 195 and 196 to the reservoir line 199.

This restriction of flow in channels 195 and 196 tends to slow down the rate of operation of the table and vertical slide during a change in their direction of movement caused by rotation of the hydraulic motor 162. It should now be clear that the tracer finger 104 can be connected to automatically control the path of movement of the cutting tool in two directions, or in other words, in any direction in a vertical plane and that by shifting the valve plunger 150 and latching it in the position shown in Figure 11 that the relative direction of movement of the cutting tool with respect to the work may be manually guided or controlled by the steering wheel 169 and that this control may be cut out or stopped by the shifting of valve plungers 58 and 41 into the position shown in Figure 11, resulting in the two cylinders 13 and 19 being reconnected to the servo-valves for control thereby.

The crank 152 which operates the control valve 150 is mounted on a shaft 200 which projects through the top of the tracer valve housing 201 as shown in Figure 4 where it is provided with a control knob 202. The crank 107 which is operatively connected to the valve plungers 41 and 58 and mounted on the shaft 108 may be rotated by a crank 203 as shown in Figure 1 which is operatively connected by linkage 204 to a lever 205 shown in Figure 2 which is secured to the upper end of a rotatable rod 206. This rod is provided with an operating handle 207 whereby upon rotation thereof the lever 107 may be rotated. It will be noted that the latch 109 can only be disengaged by hydraulic pressure in the cylinder 179 and therefore when the latch is engaged the lever 107 cannot be manually rotated. Therefore, the lever 207 can only be utilized to rotate the crank 107 in a clockwise direction, but not in a counterclockwise direction.

The in and out movement of the spindle carrier 27 toward and from the work support, or in other words, the depth control movement may be automatically controlled by the tracer 106 previously referred to, and this tracer which is shown in detail in Figure 3 has a ball and socket connection indicated generally by the reference numeral 208 with the valve sleeve 209. A spring 210 acting on the upper end of the sleeve and operating through the ball and socket connection tends to hold the tracer 106 in a central or undeflected position, the tracer being provided with a spherical journal 211 by which it is supported in the end of the housing 105.

Upon lateral deflection of the tracer the valve 209 will be caused to move axially toward the right as viewed in Figure 3. When the tracer is undeflected a pressure port 212 in the valve housing and supplied from channel 133 is connected by an annular groove 213 to channel 214 which terminates in a port 215 of valve 74. Another port 216 in the tracer is connected by annular groove 217 to a reservoir port 218.

The port 216 is connected by a channel 219 through a direct connection to a port 220 in valve 74, and a branch connection to a port 221 but this connection is through a resistance coil 222.

The valve plunger 74 is normally maintained in the position shown by a spring-pressed plunger 223 and the bore in which this plunger slides is connected by a drilled hole 224 to port 215 whereby whatever fluid pressure exists in channel 214 is communicated to the end of the plunger 223 to assist in holding the plunger 74 in the position shown. When the tracer 106 is deflected the pressure port 212 is connected by the annular groove 217 to port 216 whereby the fluid pressure will flow through the resistance 222 and port 221 to the chamber 225 at the lower end of plunger 74, thereby urging that plunger upward against the resistance of the spring-pressed plunger 223.

This movement will be sufficient to connect port 215 by way of annular groove 226 to channel 78, and port 220 by way of annular groove 227 to channel 77. The channels 77 and 78 leading from opposite ends of the cylinder 28 are thus automatically connected to the tracer controlled valve 105 upon deflection thereof. The valve 74 thus serves to automatically disconnect the cross slide cylinder 28 from the servo-control valve 65 and connect it to the tracer control valve when the tracer 106 is deflected by a pattern or master. Such deflection may be effected by rotating the servo-screw 80 to feed the cross slide in, and as soon as the tracer engages the master and becomes deflected sufficiently to shift the tracer control valve to cause admission of pressure to port 221, the change-over is automatically effected.

In addition, the valve 73 has a pressure port 229 which becomes connected to port 230 via groove 231 whereby fluid pressure is forced through a check valve 231' into channel 232 and thereby to cylinder 233. This cylinder contains a piston 234 for disengaging the half nut 235 from the servo-screw. This is necessary because slide actuation is now effected directly by the piston 29 and since no means are provided for rotating the servo-screw it is necessary to disengage the nut.

Attention is called at this point to another interlock which exists between the servo-screw 80 and the other tracer controlled valve in that in rotating the servo-screw 80 to feed the cross slide in, the operator may cause accidental engagement of the tracer finger 104 with a master or other part of the work support while setting up the machine and cause damage or breakage of the parts. To prevent this the tracer valve 103 is provided with the pressure port 180 as previously mentioned and when the plunger 172 is excessively shifted in an axial direction the port 180 is connected by an annular groove 236 in plunger 172 to a port 237 which is also connected to channel 232 leading to cylinder 233 in the cross slide housing which contains the piston 234. This piston is adapted to engage the end of a pivoted nut member 235 and cause disengagement of the nut member from the servo-screw 80, thereby rendering the screw ineffective to cause further movement of the cross slide, or in other words stopping the cross slide so as to prevent damage to the tracer finger.

There has thus been provided a hydraulic control circuit for controlling three-directional relative movement automatically and simultaneously between a cutting tool and a work support which utilizes two tracers, one of which controls reversible operation in two of said directions, and the other of which controls reversible operation in a third direction and including means whereby either of said tracers may be rendered ineffective simultaneously rendering manual controls effective; means whereby only one of said tracers may be rendered ineffective so that manual steering in a given plane is rendered possible; and suitable interlocks between the tracer control mechanisms to prevent damage to the tracers by attempts to effect excessive movement in certain directions either by manual or power means.

The structure for supporting these tracers for independent operation in guiding the relative movement between the tool and work and in a manner each independent of the other will now be explained. It will be noted from Figures 1 and 2 that the spindle carrier 27 is supported for two-directional movement, and this spindle carrier has a self-contained transmission including a prime mover 238 which is attached to the rear of the carrier by a bracket 239 so as to be movable therewith for driving the spindle 171 which holds a cutting tool 170. Opposite the cutting tool and mounted on the table 11 is a work supporting bracket 240 and on top of that is a pattern or master supporting bracket 241. The bracket 241 rests on the top surface of the bracket 240, and a central pivot 242, Figure 9, interconnects the same whereby the bracket may be angularly adjusted. In addition, the upper bracket may be adjusted back and forth by the adjusting screw 242'.

Thus, the face 243 may be adjusted relative to the face 244 of the bracket 240. The screws 243' at either end serve to swivel the upper bracket. The purpose of this adjustment is that after the pattern or master is attached or bolted into place on the face 243 the longitudinal surfaces may be slightly out of line with the direction of travel of the table and by this simple adjusting means correction may be easily effected without disturbing the various clamping means by which the pattern or master has been secured in place.

In a tracer controlled machine of the character described it is necessary that the tracer partake of the movement imparted to the cutter in order that control may be maintained. Since the two tracers 104 and 106 are coupled for control of a single tool it is necessary that they be responsive to the movements of the spindle carrier and therefore are mounted on the carrier.

To this end a tracer bracket, indicated generally by the reference numeral 245 in Figures 1 and 2, has been provided with a dovetail guide 246 formed on the bottom thereof for reciprocation in the dovetailed guideway 247 formed on the top of the spindle carrier 27.

Referring to Figure 5 the underside of the dovetail guide 246 is provided with rack teeth 248 which are adapted to be engaged by a pinion 249 which is attached to the end of a shaft 250 which is journaled in the carrier 27 and provided with a hand wheel 251 shown in Figure 2. Rotation of this hand wheel serves to adjust the tracer bracket toward and from the pattern support and also relative to the cutting tool 170.

The tracer bracket is provided with a vertical guideway 252 on one face upon which is mounted a saddle 253 for carrying one of said tracers and a saddle 254 for carrying the other tracer.

Means are provided whereby these saddles may be independently adjusted relative to one another and this means comprises two elevating screws 255 and 256. These screws are journaled for rotation in opposite ends of the bracket and as shown in Figure 5 the lower end of screw 256 is provided with a bevel gear 257 and the lower end of screw 255 is provided with a bevel gear 258. The screw 256 is threaded in a nut 259 carried by the saddle 253.

The screw 256 is adapted to be manually rotated to effect adjustment of the saddle 253 by means comprising a bevel gear 260 which is keyed to a shaft 261 in a position to mesh with the bevel gear 257. The shaft 261 extends longitudinally through the base housing 262, Figure 2, of the bracket 245 where it is provided with another bevel gear 263 for engagement with a bevel gear 264 attached to the end of a shaft 265 which is journaled in the wall of the housing 262 and provided with an operating handle 266. It will now be evident that rotation of the handle 266 will effect adjustment of the saddle 253 which supports the two-directional tracer 104.

The bevel gear 258 which operates the screw 255 is similarly connected through bevel gearing and connecting shaft indicated generally by the reference numeral 267 in Figure 5 to an operating handle 268 mounted on the rear of the housing 262 as shown in Figure 2 and adjacent to the lever 266.

The saddle 253 carries a knee 269 which is supported in guides 270 and 271 formed on the saddle and translation or adjustment is effected by means of a rack bar 270' which is attached to the saddle, and a pinion 271' which intermeshes with the rack and is attached to the end of a shaft 272 which is journaled in the knee and provided with an operating handle 273. The knee 269 is provided with guide surfaces 274 and 275, Figure 4, for guiding the tracer housing 201. The tracer housing 201 contains the tracer control valve 103, the selector control valve 149, the two reversing valves 128 and 119, together with the eccentric 158 and the power driving mechanism therefor including the hydraulic motor 162.

The eccentricity of the eccentric means 158 may be varied or adjusted by the truncated cylindrical member 276 which has a shifter collar 277. As shown in Figure 5 this collar is engaged by an eccentric pin 278 attached to the end of a shaft 279 journaled in the wall of the housing and this shaft is provided with a gear segment 280. A pinion 281 attached to the end of a shaft 282 serves to rotate the segment and thereby the pin 278 to shift the collar 277.

The shaft 282 is journaled in a plate 283 and provided with a bevel gear 284 which intermeshes with a bevel gear 285 arranged at right angles thereto. The bevel gear 285 is attached to the end of a shaft 286 which is journaled in a housing 287. The housing 287 is bolted to the plate 283 and this plate is capable of limited angular adjustment to change the angle of the depending shaft 286 to suit the convenience of the operator.

This is accomplished by providing the plate 283 with elongated slots 288 at opposite ends as shown in Figure 10 through which pass clamping bolts 289. The shaft 286 extends through pendant arm 290 which is secured to the housing 287 and the projecting end of the shaft 286 provided with an operating lever 291. A graduated collar 291a is fixed with handle 291 and movable therewith relative to a fixed reference mark 291b to indicate the feed rate setting. This makes a convenient arrangement whereby the operator may change the rate of tracing or relative feeding between cutter and work from his position on the floor.

The tracer housing 201 may be adjusted on the guideways 274 and 275 by means of a screw 292 which is threaded in a nut 293 depending from the underside of the housing 201. The screw is journaled in opposite ends of the knee and is provided with a square end 294 as shown in Figure 5 for attachment of a removable wrench.

The saddle 254 is supported on the guideways 252 and operatively connected to the screw 255 by a half nut 295 as more particularly shown in Figure 7. The half nut is formed on the end of a retractable plug 296 which is slidably mounted in the saddle 254 as more particularly shown in Figure 8. The plug is held against rotation by a pin 297 engaging a slot 298 formed longitudinally of the plug. A pin 299 eccentrically mounted on the end of a shaft 300 engages a slot 301 formed in the plug whereby rotation of the shaft will effect disengagement of the half nut 295. The shaft 300 may be rotated by a handle 302 locked to effect shifting of the nut.

To insure against any possibility of the saddle dropping when the nut is disengaged a counterbalance is provided comprising a counterweight 364 shown in Figure 5 which is connected by a chain 365, passing over a pulley 366, Figure 1, to the saddle 254 as shown in Figure 6.

The object of providing a disengageable nut on the saddle is to make it possible to lock the saddle against vertical movement with respect to the tracer bracket so that a plate template lying in a horizontal plane may be utilized as a pattern for the depth control tracer which would be possible where the work is to have a uniform cross section. This would be produced by reciprocating the table, and at the end of each table stroke indexing the cutter laterally, i. e., in a vertical direction.

By locking the saddle against vertical movement this indexing movement would not be imparted to the tracer whereby it would remain in alignment with the plane of the template. To this end the saddle 254 is provided with a detachable bracket 303, more particularly shown in Figures 3 and 6, which may be secured to the saddle 254 by a pair of screw threaded members 304 having knurled operating knobs 305. The bracket is provided with a key 306 which is adapted to fit in a key slot 307 formed on the saddle 254. The upper end of the bracket is provided with a roller 308 which is adapted to fit in a longitudinally extending slot 309 formed on a fixed support 310. This fixed support is secured as by bolts 312 to the end of a gooseneck arm 313 which, as shown in Figure 1, is attached to the top of the column 15. By providing the roller connection it will be obvious that the tracer support will move toward and from the work support whenever the carrier 27 is moved, but when the carrier is moved vertically by the slide 17 the tracer bracket 245 will move up and down relative to the saddle 254.

An interlock is provided to insure that the half-nut 295 is disengaged from the screw 255 whenever the bracket 303 is placed in position and this includes an interlock pin 314 which is slidably supported in a bore 315 in the saddle 254 and adapted to project into key slot 307 as shown in Figure 7 whereby when the bracket is placed in position the key 306 will shift the interlock pin to the right as viewed in Figure 7. The interlock pin has a bevel connection 316 with the end of a shifter rod 317 which is continuously urged in one direction by a spring 318. The rod 317 has a slot 319 into which fits a pin 320 mounted crosswise of the shaft 300 as shown in Figure 8. Therefore, when the shifter rod 317 is depressed it will cause rotation of the shaft 300 and thereby through the eccentric connection 299 cause withdrawal of the half-nut 295.

With the upper carrier clamped against vertical movement and the tracer bracket 245 free to move up and down there is a possibility of collision between these two brackets and in order to prevent damage to the parts an interlock is provided which is effective to reduce the pump pressure in the system because such a movement would be produced by the introduction of fluid pressure to the lower end of cylinder 19 as viewed in Figure 1. This is accomplished by providing a limit switch 321 which when operated shuts down the motor 321' that drives the pumps 136 and 137.

The saddle 254 as shown in Figure 6 has a rod 322 slidably mounted therein and projecting below the lower end thereof for engagement by a lug 323 formed integral with the saddle 253 as shown in Figure 5. The upper end of the rod 322 engages a shoulder 324 on a rocker shaft 325 which has a second shoulder 326 engaging the end of a pivot lever 327. The other end of the lever engages a trip rod 328 which is normally urged in one direction by a spring 329 interposed between a fixed part of the support 310 and a collar 330 attached to the rod.

When the rod 322 is pushed upward it rotates the rocker shaft and thereby the lever 327 and pushes the trip rod 328 upward against the resistance of spring 329 and causes actuation of the limit switch 321.

Occasion may arise where it may be desirable to utilize a plate template with the lower tracer 104, in which case the tracer could not be responsive to in and out movements of the carrier 27 as dictated by the upper tracer 106. Means have, therefore, been provided for rendering the lower tracer support non-responsive to control movements of the upper tracer. This means comprises an arm 331 which is attached to the top of the vertical slide 17 as indicated in Figure 1. As shown in Figure 4, this arm has a slotted plate 332 attached to the end thereof and the cross slide 269 of the lower tracer support has a gooseneck arm 333 projecting from the rear end thereof in which is mounted a bar 334 which is of rectangular cross-section and is positioned to extend across the face of the plate 332. The bar 334 supports a clamping member indicated generally by the reference numeral 335 and this clamping member comprises front and rear members which are hinged together by a pin 336.

The clamping bolt 337 is pivotally connected to the rear member by a pin 338 and is adapted to swing down between a pair of ears 339 formed on the front member. A threaded member 340 is threaded on the bolt and is adapted to draw the front and rear members together in clamping engagement with the bar 334. The clamping member carries a roller 341 which fits in a slot 342 in the plate 332. It will, therefore, be apparent that when the bar 334 is clamped to the plate 332 by the clamping member that the slide 269 is held against axial movement but the entire structure is still capable of vertical movement. When this is done, handle 273 is pulled out to disengage the pinion from the rack.

It is thus possible to hold the tracer 104 against axial movement as dictated by the upper tracer 106.

Remote control means have been provided for actuating the depth control tracer valve in such a manner as to effect disengagement of the tracer from its pattern. Referring to Figure 11 it was stated supra that the valve 73 is automatically shifted upon deflection of the tracer 106 to effect control connection between the tracer valve and the cylinder 28. Once this connection is established it can only be broken by shifting the tracer control valve in a direction corresponding to excessive deflection of the tracer, or, in other words, interconnection of ports 212 and 216.

Since the tracer 106 is inaccessible to an operator standing on the floor beside the machine a remote control connection is provided for this purpose.

This includes a remote control flexible shaft indicated generally by the reference numeral 342 in Figure 3. The flexible wire 343 which extends through a flexible sleeve 344 is connected to an operating rod 345 which has heads 346 and 347 formed on opposite ends thereof. The rod 345 is slidable relative to a cover plate 348 attached to the end of the tracer valve plunger 209. A spring 349 acts on the head 347 to hold the rod in such a position that the head 346 will not interfere with the normal operation of the valve.

When it is desired to shift the valve the wire 343 is pulled until the head 346 engages the plate 348 against the resistance of spring 349 after which further movement will shift the valve plunger to effect the necessary interconnection of ports 212 and 216 which will cause admission of fluid pressure to cylinder 28 in such a direction as to move the tracer out of engagement with the pattern and after the separation has been effected the wire 343 is released whereupon the tracer valve assumes its normal undeflected position under the influence of spring 210.

This will result in the port 216 becoming connected to the exhaust port 218, thereby relieving the pressure on the lower end of piston 74 which will be returned to its normal position and thereby disconnect the tracer from control of the piston 29.

The flexible sleeve 344 is connected to a fixed bracket 350 and the wire is connected at 351 to a collar 352 attached to a rod 353. This rod is slidable within the tubular member 206 which as shown in Figure 12 has a pair of elongated slots 354 formed in opposite sides thereof. A pin 355 which passes through the rod 353 extends through these slots to connect the hand grip 356 to the rod.

It will now be obvious that by vertical movement of the hand grip 353 the tracer valve may be remotely controlled to effect disengagement of the tracer by pulling upward on the hand grip. The tracer valve housing 105 is slidably connected by a dovetailed guideway 357 on a knee 358 and cross movement thereon is effected by the cross screw 359. A clamping member 360 is threaded in the tracer valve housing support for clamping the parts after adjustment. The knee 358 is supported by dovetailed guideways 361 for movement relative to the bracket 254 by means of an adjusting screw 362 having an operating handle 363.

By means of the two adjusting screws 359 and 363 relative adjustment may be effected between the tracer 106 and tracer 104.

There has thus been provided an improved automatic profiling and die-sinking machine which utilizes a pair of tracers, one of which automatically controls universal movement in a plane and the other of which automatically controls relative movement between a tool and a work piece in a direction at right angles to said plane.

What is claimed is:

1. In a pattern controlled machine tool having a cutter support and a work support mounted for three-directional relative movement, the combination of means for automatically controlling the three directions of movement simultaneously including a first pattern controlled automatic tracer for governing two directions of said movement, a second pattern controlled automatic tracer for governing a third direction of said relative movement, said tracers being mounted on one of said supports, said other support being adapted to support patterns in opposition to said tracers, and control interconnections rendering each tracer adaptable to control at least one direction of relative movement between the other tracer and its pattern.

2. In a pattern controlled machine tool having a cutter support and a work support mounted for three-directional relative movement, the combination of means for automatically controlling the three directions of movement simultaneously including a first pattern controlled automatic tracer for governing two directions of said movement, a second pattern controlled automatic tracer for governing a third direction of said relative movement, said tracers being mounted on one of said supports, said other support being adapted to support patterns in opposition to said tracers, control interconnections rendering each tracer adaptable to control at least one direction of relative movement between the other tracer and its pattern, and means for rendering one of said tracers non-responsive to a direction of movement controlled by the other tracer.

3. In a pattern controlled machine tool having a cutter support and a work support mounted for three-directional relative movement, the combination of means for automatically controlling the three directions of movement simultaneously including a first pattern controlled automatic tracer for governing two directions of said movement, a second pattern controlled automatic tracer for governing a third direction of said relative movement, said tracers being mounted on one of said supports and the other support being adapted to support patterns in opposition to said tracers, control interconnections rendering each tracer adaptable to control at least one direction of relative movement between the other tracer and its pattern, and means for rendering either tracer non-responsive to the control action of the other tracer.

4. In a pattern controlled machine tool having a cutter support and a work support mounted for three-directional relative movement, the combination of means for automatically controlling the three directions of movement simultaneously including a first pattern controlled automatic tracer for governing two directions of said movement, a second pattern controlled automatic tracer for governing a third direction of said relative movement, said tracers being mounted on one of said supports, said other support being adapted to support patterns in opposition to said tracers, control interconnections rendering each tracer adaptable to control at least one direction of relative movement between the other tracer and its pattern, and selective means for rendering either tracer non-responsive to a controlled direction of movement of the other tracer.

5. In a pattern controlled machine tool having a work support and a tool support, means mounting the tool support for two directions of relative movement, a pair of tracers mounted on the tool support for cooperation with patterns carried by the work support, control connections from one of said tracers for controlling one direction of movement of the tool support, control connections from the other tracer for controlling the other direction of movement of the tool support, means to render one of said tracers non-responsive to the movement controlled by the other tracer, and interlock means to prevent collision of said tracers when one of them is held against movement.

6. In automatic control means for a pattern controlled machine tool, the combination of a pair of tracers, individual supports for each tracer, a common support for said tracer supports, means to effect adjustment of one of said tracer supports independently of the other including a rack and pinion, means to disconnect the pinion from said rack, a fixed support for said common support, means to connect the adjustable tracer support to the fixed support whereby upon movement of said common support only one tracer support will be moved.

7. In a pattern controlled machine tool having a bed, a work support mounted thereon, a column, a spindle carrier mounted on the column for vertical and horizontal movement, a tracer support mounted on the top of the carrier for movement therewith, means on the carrier for adjusting the tracer support toward the work support to effect control engagement of the tracer with a pattern, a vertical rod supported by the column, a remote control flexible shaft coupling the rod with the tracer whereby actuation of the rod will cause movement of the tracer valve in a direction to effect disengagement of the tracer from the pattern.

8. In a pattern controlled machine having a bed, a work support slidably mounted on the bed, a column, a spindle carrier mounted on the column for two-directional movement, a pair of tracers mounted on the carrier, a control valve associated with each tracer, a selector valve mounted on the column for connecting and disconnecting one of said tracer control valves with operating means for the movable parts, telescoping control elements mounted on the column, means connecting one of said elements to the selector valve, means to rotate said element to effect shifting of said selector valve, means connecting the other element to one of said tracer valves, and means to effect axial movement of the element to shift the tracer valve.

9. In a pattern controlled machine tool having a work support and a tool spindle carrier supported for relative movement in a plurality of directions and a pair of tracer supports carrying automatic tracers mounted on said carrier, the combination of means for adjusting said tracer supports relative to one another including individual translating screws, means to disconnect one tracer support from its translating screw, a counterbalance for the disconnected tracer support and means to connect said disconnected tracer support to a fixed part of the machine whereby said spindle carrier may move without moving said disconnected tracer support.

10. In a pattern controlled machine tool having a cutter support and a work support, and means mounting said supports upon the machine tool for relative movement in three directions, the combination of means for automatically effecting and controlling said movement including a rotatable direction determinator, a first pattern controlled automatic tracer operatively connected for actuating said direction determinator and thereby determining the resultant of two of the directions of relative movement, and a second pattern controlled automatic tracer for governing a third direction of relative movement between said supports.

11. In a pattern controlled machine tool having a cutter support and a work support, and means mounting said supports for three-directional relative movement, the combination of a pair of tracer mechanisms mounted on one support for engaging separate patterns carried by the other of said supports, servo-motor mechanisms each including a manually operable control for producing each of said three directions of movement, one of said mechanisms being operable to move the tracers toward their respective patterns, means to render said mechanism inoperative upon engagement of the first tracer with its respective pattern, and other means for adjusting the other tracer in engagement with its pattern.

12. In a pattern controlled machine tool having a cutter support and a work support, the combination with means for mounting said supports for three-directional relative movement of individual manually operable servo-motor mechanisms for each of said directions of relative movement, a tracer mechanism having a deflectable tracer mounted on one of said supports for automatic control by a pattern carried by the other support, disconnect devices associated with each servo-motor mechanism for rendering the same non-responsive to manual actuation, and means operable by the tracer upon initial deflection thereof during movement in any direction by any of said servo-motor mechanisms to effect simultaneous disengagement of all of said disconnecting devices.

13. In a pattern controlled machine tool having a work support and a tool spindle carrier mounted on the machine for relative movement in a plurality of directions and a tool spindle journaled in said carrier, the combination of a pair of tracer supports mounted on the machine and each having a tracer extending substantially parallel to the axis of said spindle, means for adjusting said tracer supports relative to one another including individual translating screws, means to disconnect one tracer support from its translating screw and connect it to a fixed part of the machine whereby the spindle carrier may be bodily moved with respect to said tracer to change the spacing between said cutter spindle and tracer.

14. In a pattern controlled machine tool having a work support and a tool spindle carrier mounted on the machine for relative movement in a plurality of directions, a tool spindle journaled in said carrier, said carrier having a guideway formed therein parallel to the axis of the spindle, the combination of a bracket mounted on said guideway, means to adjust said bracket parallel to the axis of the spindle, a pair of slides mounted on said bracket for sliding movement normal to the axis of said spindle, a tracer head mounted on each slide, a tracer mounted on each tracer head and extending substantially parallel to the axis of said spindle, and individual means to adjust each tracer head parallel to or laterally of said spindle axis to determine the spacing between the spindle and each of said tracers.

15. In a pattern controlled machine tool having a cutter support and a work support, said supports being mounted on the machine for three-directional relative movement, the combination of means for effecting and controlling said movement including a pair of automatic tracer control mechanisms, a tool spindle journaled in the cutter support, tracer fingers associated with each of said tracer mechanisms and arranged in parallel relation to said cutter spindle, means controlled by one of said mechanisms for determining the direction of lateral movement of said spindle, means controlled by the other tracer mechanism for determining axial movement of said cutter spindle, and rate control means associated with the first tracer control mechanism for determining the rate of scanning of the second tracer finger.

EDWARD W. YATES.
TAFT S. ARMANDROFF.